(12) United States Patent
Wessling et al.

(10) Patent No.: US 7,412,659 B2
(45) Date of Patent: Aug. 12, 2008

(54) COLORIZED TEMPLATE PREVIEWS

(75) Inventors: Cynthia Dahl Wessling, Redmond, WA (US); John Thomas Carlson, Seattle, WA (US); Rob Dolin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 669 days.

(21) Appl. No.: 10/856,418

(22) Filed: May 28, 2004

(65) Prior Publication Data

US 2005/0268229 A1    Dec. 1, 2005

(51) Int. Cl.
*G06F 3/048* (2006.01)
(52) U.S. Cl. .................... 715/764; 715/788
(58) Field of Classification Search ............... 715/764, 715/788
See application file for complete search history.

(56) References Cited

U.S. PATENT DOCUMENTS

| | | | | |
|---|---|---|---|---|
| 5,680,629 | A | | 10/1997 | Slayden et al. ............ 395/789 |
| 5,903,905 | A | | 5/1999 | Andersen et al. ............ 707/526 |
| 5,986,670 | A | * | 11/1999 | Dries et al. ............ 345/629 |
| 6,253,216 | B1 | * | 6/2001 | Sutcliffe et al. ............ 715/500 |
| 6,313,824 | B1 | | 11/2001 | Meisner et al. ............ 345/150 |
| 6,321,458 | B1 | * | 11/2001 | Hess ............ 33/566 |
| 6,546,400 | B1 | * | 4/2003 | Aberson ............ 707/104.1 |
| 6,600,574 | B2 | * | 7/2003 | Miyano ............ 358/1.9 |
| 6,601,057 | B1 | * | 7/2003 | Underwood et al. ............ 707/1 |
| 6,616,702 | B1 | | 9/2003 | Tonkin ............ 715/515 |
| 6,650,433 | B1 | * | 11/2003 | Keane et al. ............ 358/1.15 |

OTHER PUBLICATIONS

Habraken, Joe. "Sams Teach Yourself Microsoft Publisher 2000 in 10 Minutes." Smas Publishing. May 6, 1999.*

* cited by examiner

*Primary Examiner*—Doug Hutton
*Assistant Examiner*—Soumya Dasgupta
(74) *Attorney, Agent, or Firm*—Merchant & Gould, P.C.

(57) ABSTRACT

Methods and systems are provided for generating colorized previews of selected document templates. Upon selection of a desired color scheme, each document template represented by a collection of displayed document template previews is colorized according to a user-selected color scheme to provide the user with a preview of the collection of document templates colorized according to the user's desired color scheme prior to selection of one of the displayed templates for actual use. The colorized document templates are converted to bitmap format and are displayed to the user to allow the user to select a particular template colorized according to the user's selected color scheme.

26 Claims, 6 Drawing Sheets

COLORIZED TEMPLATE PREVIEWS

FIELD OF THE INVENTION

The present invention generally relates to presentation of computer-generated documents. More particularly, the present invention relates to generation and display of colorized previews of computer-generated documents and templates.

BACKGROUND OF THE INVENTION

With the advent of the computer age, computer and software users have grown accustomed to user-friendly software applications that help them write, calculate, organize, prepare presentations, send and receive electronic mail, make music, and the like. Mode word processing applications, for example, allow users to create and edit a variety of useful documents. Modem desktop publishing applications, for another example, allow users to create a variety of useful documents and presentations such as newspapers, newsletters, brochures, advertisement layouts, stationery, and the like.

Many software applications, such as word processing applications and desktop publishing applications, allow users to select a document template from a collection of pre-prepared templates for use in preparing a document such as a brochure, flyer, advertisement sheet, sign, business card, and a variety of other helpful and useful documents. Many such applications allow users to customize documents by applying user-selected color to portions of the document. For example, a user may select a color scheme containing the colors green and blue, and a border around a particular document may be colored blue and a background may be colored green.

Prior systems often display a collection of templates where each template includes one or more fields defined for colorization, if desired. Typically, these fields are colored with one or more default colors to allow a user to visualize the collection of templates with added colorization. When the user selects one of the templates for use, the selected template is then displayed or opened in the editing application and the collection of templates is dismissed. The user may then select a desired color scheme for application to the selected template in place of the default color scheme. Unfortunately, if a user decides that a different template is preferable, the user must dismiss the selected and displayed template, return to the displayed collection of templates, select a different template for opening in the application, and apply the desired color scheme to the second selected template. Such a back-and-forth selection/colorization process is cumbersome and limits the user's ability to fully appreciate and evaluate the breadth of available templates.

Accordingly, there is a need for a method and system for providing colorized previews of available document templates where a user can preview the application of a selected color scheme to a number of available document templates prior to selection of a particular document template for use. It is with respect to these and other considerations that the present invention has been made.

SUMMARY OF THE INVENTION

Embodiments of the present invention provide methods and systems for providing colorized previews of available document templates. A user may preview the application of a selected color scheme to a number of available document templates prior to selection of a particular document template for use. According to an aspect of the invention, upon selection of a category or type of document template, a collection of template previews corresponding to the selected type is displayed in miniaturized bitmap format. Any fields in each template comprising the displayed collection that are defined for colorization are colorized with one or more default colors to allow a user to visualize the location of the colorized fields in each template.

Upon selection of a user-specified color scheme, the template previews and the selected color schemes are passed to a software application responsible for generation of the template previews. The selected color scheme is applied to each template comprising the collection of templates. The templates are then converted to miniaturized bitmaps that are colorized with the user-selected color scheme and are then returned for display. Thus, each template in the collection of template previews is now displayed with user-selected colors applied to fields in the template previews defined for receiving color. Accordingly, the user may review each of the templates with the desired color scheme prior to selection of one of the templates for actual use.

According to another aspect of the invention, upon selection of a category or type of document template, the collection of template previews is displayed in bitmap format, and any fields of the template previews defined for receiving color are colorized with placeholder colors. Upon selection of a user-selected color scheme, each placeholder color of each displayed template preview is replaced with colors from the user-selected color scheme. After all color placeholders have been replaced, the template previews are redrawn and are displayed with the user-selected color schemes in place of the color placeholders. The user may then review each of the templates with the desired color schemes prior to selection of one of the templates for actual use.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to methods and systems for generating colorized previews of selected document templates. Upon selection of a desired color scheme, each document template comprising a collection of displayed document templates is colorized according to a user-selected color scheme to provide the user with a preview of the collection of document templates colorized according to the user's desired color scheme prior to selection of one of the displayed templates for actual use.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
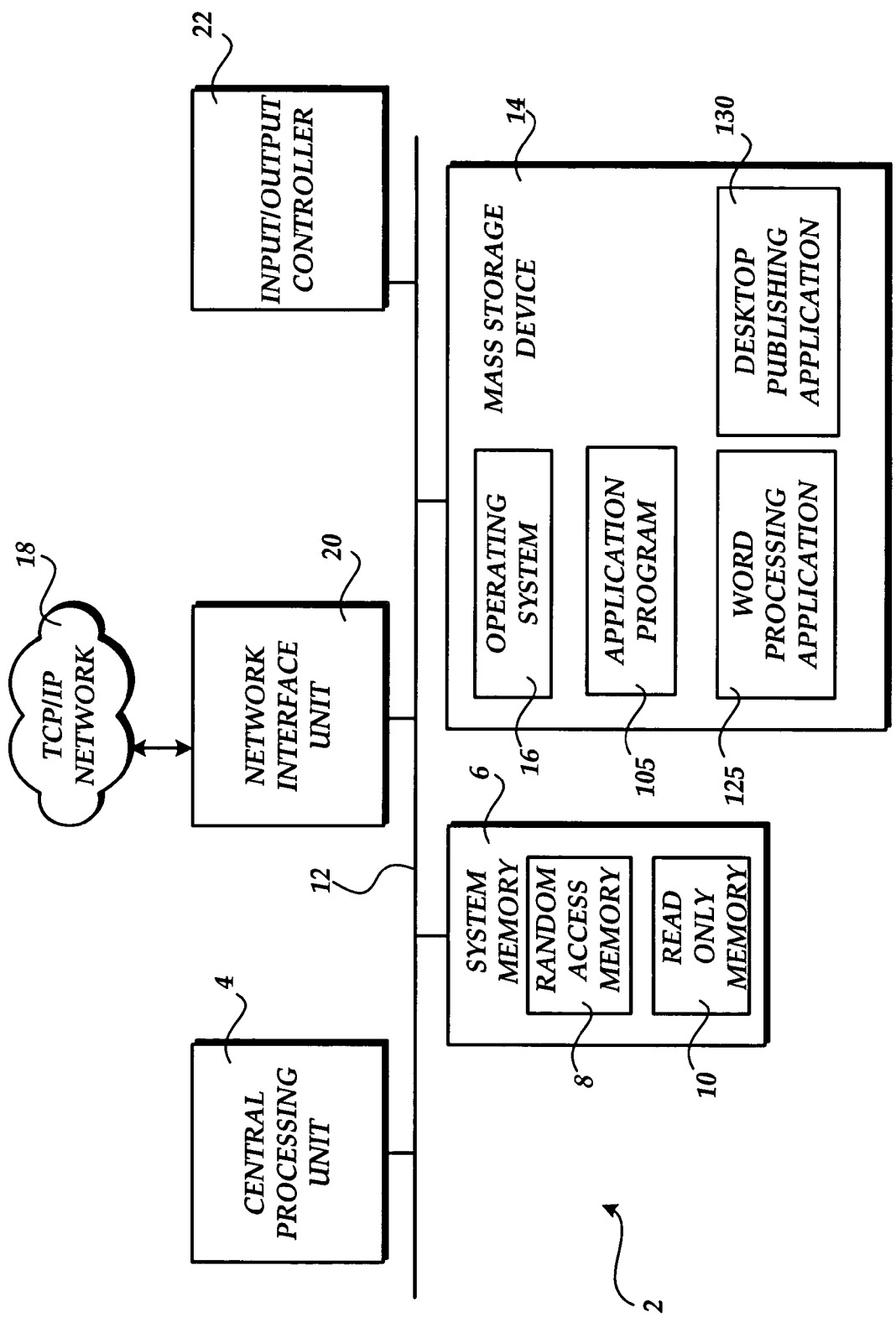
FIG. 1 illustrates an exemplary computing operating environment for embodiments of the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Washington. The mass storage device 14 and RAM 8 may also store one or more application programs. In particular, the mass storage device 14 and RAM 8 may store an application program 105 for providing a variety of functionalities to a user. For instance, the application program 105 may comprise many types of programs such as a word processing application program, a spreadsheet application, a desktop publishing application, a database application and the like.

According to an embodiment of the present invention, the word processing application 125 and the desktop publishing application 130 contain sufficient computer-executable instructions for generating colorized template previews as described herein. An example word processing application 125 for use in accordance with the present invention is WORD manufactured by Microsoft Corporation. An example desktop publishing application 130 for use in accordance with the present invention is PUBLISHER manufactured by Microsoft Corporation. As should be appreciated, the present invention may be operated by a variety of different software applications capable of applying a selected color scheme to one or more fields or areas in a document defined for receiving colorization. For example, embodiments of the present invention may be operated by spreadsheet applications, drawing applications, slide presentation production applications and others.

Figure 2:
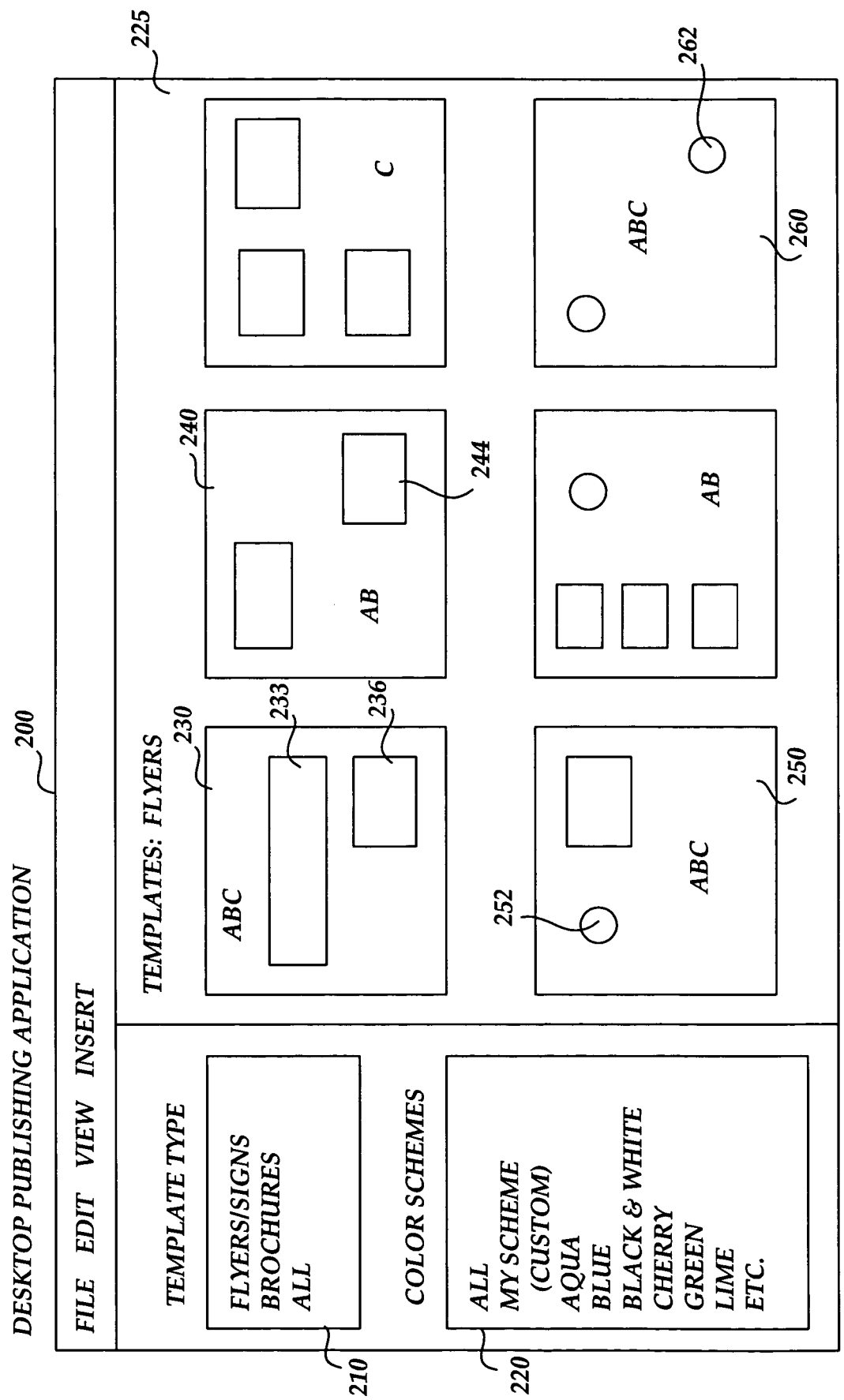
FIG. 2 is a simplified block diagram of a desktop publishing application user interface for displaying colorized templates with user-selected color schemes according to embodiments of the present invention.

FIG. 2 is a simplified block diagram of a desktop publishing application user interface for displaying colorized templates with user-selected color schemes according to embodiments of the present invention. As illustrated in FIG. 2, an example user interface 200 is provided for displaying a plurality of template previews for review by a user according to embodiments of the present invention. The user interface 200, illustrated in FIG. 2, is illustrative of a user interface provided by a word processing application, desktop publishing application, spreadsheet application, slide presentation application, and the like which is capable of displaying a collection of document templates from which a user may select a desired template for use and creation of an associated document. As should be understood by those skilled in the art, the user interface 200 is for purposes of example only and is not restrictive of the numerous types of user interface layouts and functionalities that may be utilized in accordance with embodiments of the present invention.

Referring to the user interface 200, a publication/template type selection pane 210 is provided for allowing a user to select a category or type of document template to be reviewed and/or selected by the user. For example, if the user selects the "flyers/signs" template type, the workspace 225 of the user interface 200 will be populated with a collection of miniaturized template previews corresponding to the selected template type. According to an embodiment of the invention, the template previews, also known as thumbnail views, are displayed as bitmap views of actual templates that may be used/edited by a user. For example, if the user selects the "flyers/signs" template type, the bitmap-formatted template previews 230, 240, 250, 260 displayed in the workspace 225 will be previews of various flyers/signs templates available for selection by the user. Alternatively, if the user selects a different type of template, for example "brochures," the workspace 225 will be populated with a collection of brochure type template previews. As is well known to those skilled in the art, many software applications, such as word processing applications and desktop publishing applications, contain collections or libraries of selectable templates.

Once the user decides on a particular template from the displayed collection of template previews, the user may select the desired template preview, and an actual template corresponding to the selected template preview will be displayed in the workspace 225 for use by the user. That is, once the selected template is displayed in the workspace 225, the user may populate various data fields in the template with desired content, and the user may edit or otherwise modify content or formatting previously applied to the selected template.

Referring to the example template previews illustrated in the workspace 225 of the user interface 200, each template preview may include one or more fields defined for receiving colorization. For example, the template preview 230 includes fields 233 and 236 that are defined for receiving colorization. The fields 233 and 236 may include regions of the template such as borders, text boxes, logos, and the like that are defined by the developer of the template for receiving colorization to enhance a visual effect of the completed template. Accordingly, if a user selects that the template preview 230 is to be colorized according to a blue color scheme, for example, the fields 233 and 236 will be colored blue by the software application responsible for displaying the corresponding template in the workspace 225. Referring to the other example template previews, illustrated in FIG. 2, a variety of other versions of the selected template type are displayed to the user as template previews, and each of the displayed template previews may contain one or more fields or areas defined for receiving colorization designated by the user.

Referring still to FIG. 2, a color schemes selection pane 220 is provided for providing a plurality of color schemes that may be selected by the user for application to the displayed template previews and to an actual template selected by the user from the displayed collection of template previews. As will be described in detail below, according to embodiments of the present invention, the user may select one of the available color schemes provided in the color scheme pane 220 for application to each of the template previews displayed to the user in the workspace 225 so that the user may preview application of a selected color scheme to each of the displayed template previews. Thus, the user may quickly visualize application of a selected color scheme to each of the potential templates prior to selection of one of the potential templates for actual use. That is, if the user selects a particular color scheme, for example aqua, each of the color fields 233, 244, 252, 262 in the displayed template previews is colorized with the appropriate colors as designated by the selected aqua color scheme so that the user may preview each of the potential templates with the applied selected color scheme. If the user then selects one of the displayed template previews, the corresponding actual template will be displayed to the user in the workspace 225 colorized according to the selected color scheme.

Figure 3:
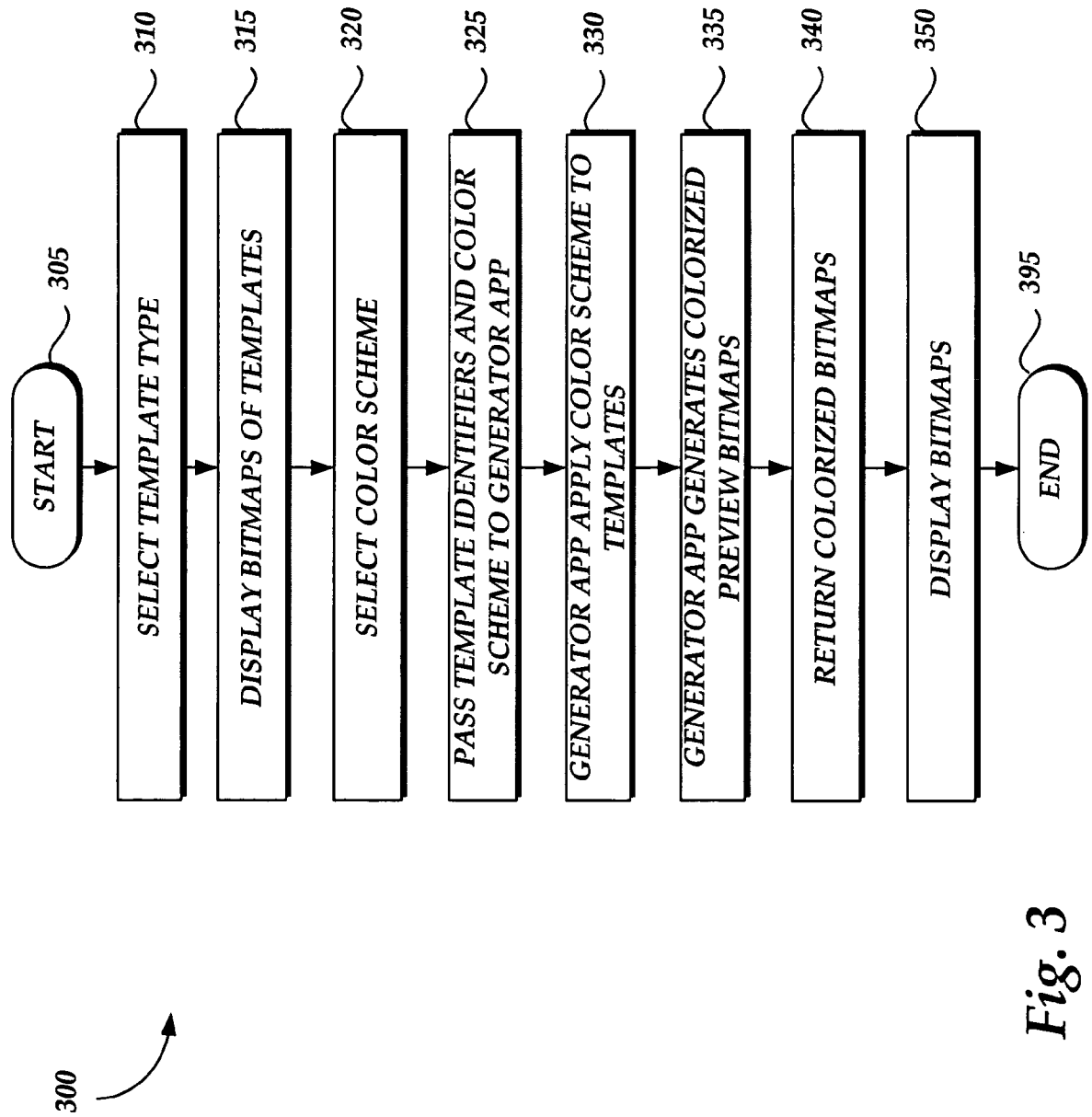
FIG. 3 is a flow diagram showing an illustrative routine for generating colorized template previews according to an embodiment of the present invention.

Having described an exemplary computing operating environment for the present invention and the operation of an exemplary software application for displaying colorized template previews according to embodiments of the present invention, an illustrative routine for generating colorized template previews according to an embodiment of the present invention will be described with reference to FIGS. 3 and 4. Referring then to FIG. 3, the illustrative routine 300 for generating colorized template previews according to an embodiment of the present invention begins at start block 305 and proceeds to block 310 where a particular template category or type is selected by a user. At block 315, a collection of miniaturized bitmap-formatted template previews 230, 240, 250, 260 are displayed, as illustrated in FIG. 2.

Figure 4:
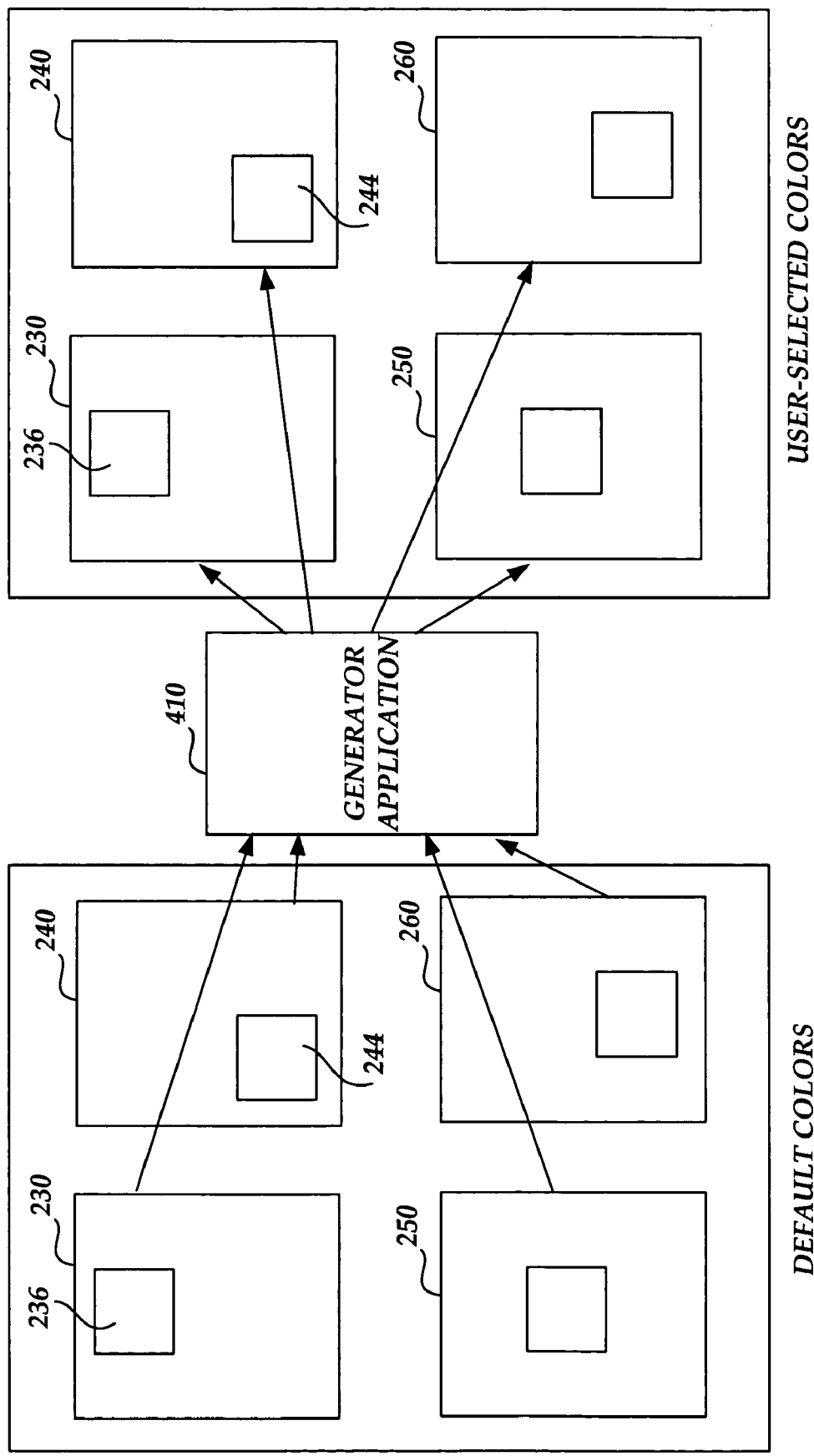
FIG. 4 is a simplified block diagram illustrating colorization of selected template previews according to an embodiment of the present invention.

Referring to FIG. 4, various fields contained in each of the displayed template previews defined for receiving colorization are colorized with a default color scheme defined by the developer of the template previews. Referring back to FIG. 3, at block 320, the user selects a particular color scheme from the color scheme pane 220 for application to each of the template previews displayed in the workspace 225 of the user interface 200. At block 325, in response to selection of a particular color scheme, the templates represented by previews 230, 240, 250, 260 and data representing the selected color scheme are passed to a generator application, illustrated in FIG. 4, for application of the selected color scheme to the templates. According to embodiments of the present invention, the generator application 410 may be the same software application in use by the user for displaying the template previews. Alternatively, the generator application may be a separate software application responsible for creating the displayed templates and for passing the displayed templates to the software application in use for display to the user.

At block 330, FIG. 3, the generator application 410 applies the selected color scheme to the templates as illustrated in FIG. 4. At block 335, the generator application creates colorized preview bitmaps from the colorized templates resulting from colorizing the templates with the color scheme selected by the user. At block 340, the colorized template previews are returned by the generator application to a software application in use by the user, for example a word processing application, a desktop publishing application, and the like, for display in the workspace 225 of the user interface 200. At block 350, the template previews colorized according to the selected color scheme are displayed with the user-selected colors applied to any fields in each of the template previews defined for receiving colorization. From a user perspective, selection of a given color scheme automatically causes a display of each of the template previews associated with the selected template type with the color scheme selected by the user applied to each of the template previews. If the user does not like the selected color scheme, the user may select a different color scheme, and the process described above is repeated, and the template previews displayed to the user are automatically colorized with the second selected color scheme.

Once the user decides on a particular template and a particular color scheme, the user may select the colorized template preview desired by the user, and an actual template corresponding to the selected template preview will be displayed to the user in the workspace 225 of the user interface 200 having the selected color scheme applied to any field in the template defined for receiving colorization. As should be understood, after the user has displayed the actual template corresponding to the selected template preview, the user may then insert desired content (text, images, data) into the selected template. The user may edit previously entered content and/or formatting, and the user may selectively apply another color scheme to the template, if desired.

Figure 5:
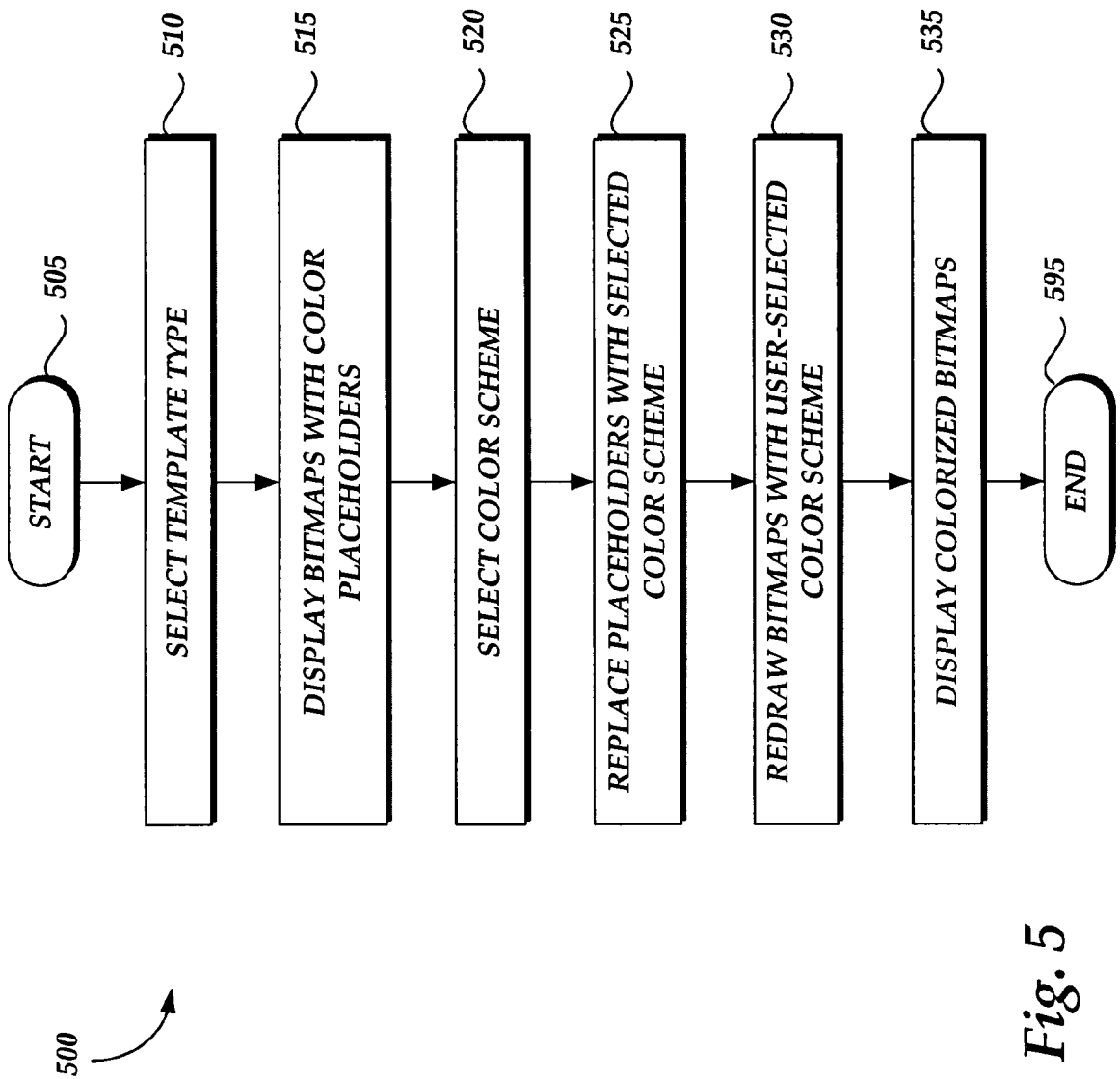
FIG. 5 is a flow diagram showing an illustrative routine for generating colorized template previews according to an alternate embodiment of the present invention.
Figure 6:
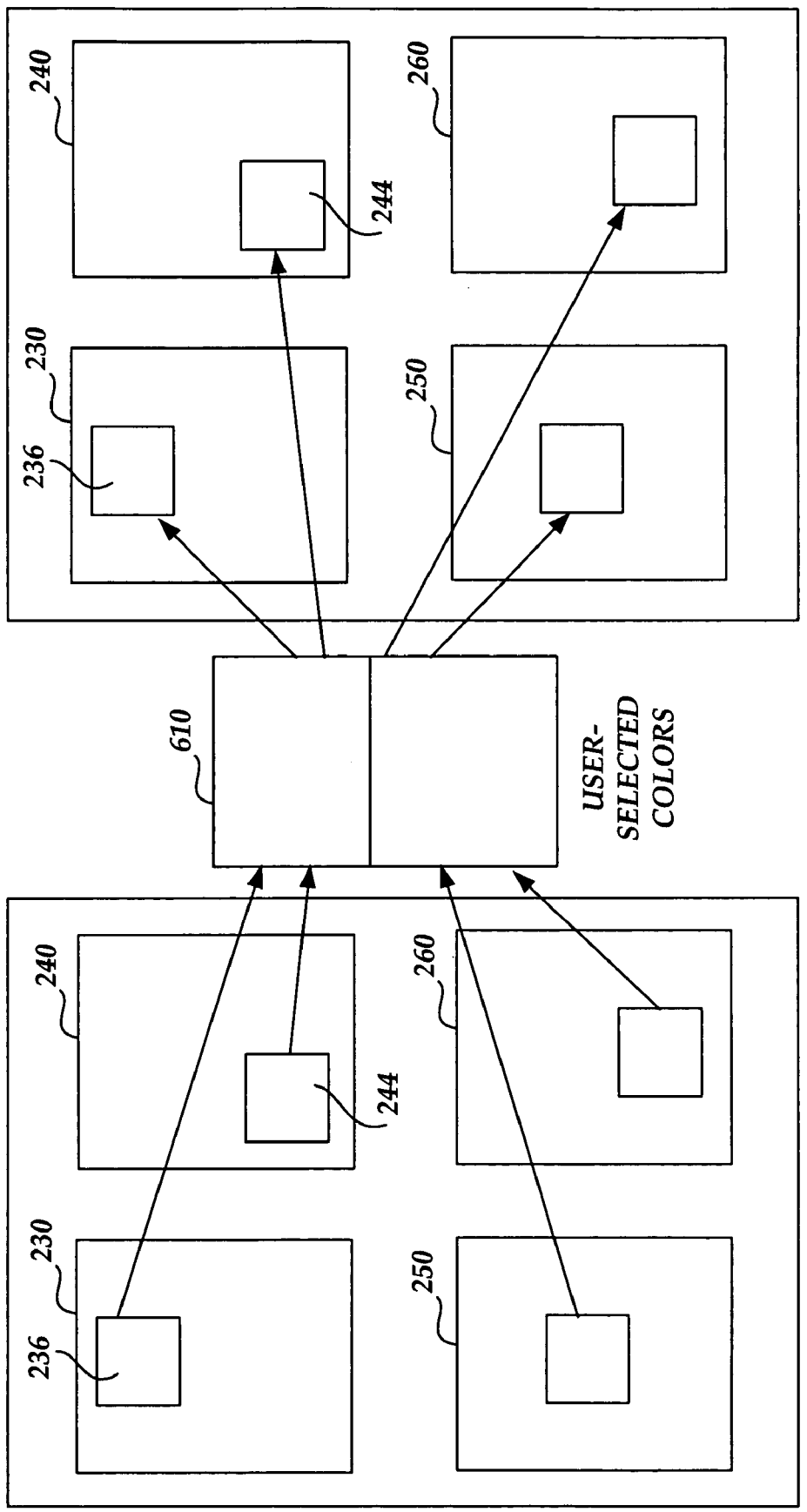
FIG. 6 is a simplified block diagram illustrating colorization of template previews with user-selected color schemes according to an alternate embodiment of the present invention.

FIGS. 5 and 6 are provided for describing an alternate method and system for generating colorized template previews. The routine 500, illustrated in FIG. 5, for generating colorized template previews begins at start block 505 and proceeds to block 510 where a template type is selected by a user from the template type pane 210, illustrated in FIG. 2. For example, as illustrated in FIG. 2, the user may select from a number of template types, for example flyers, brochures, advertisement sheets, business cards, work orders, purchase orders and the like. Upon selection of a particular template type, a collection of template previews is displayed in the workspace 225 of the user interface 200 for displaying and editing selected templates.

According to this embodiment, and as illustrated in FIG. 6, fields contained in any of the displayed template previews that are defined for receiving colorization are colorized with a default placeholder color. The placeholder color may be any of a variety of colors selected for fields or areas of a given document or template that are defined for receiving colorization. As should be understood, a placeholder color may be selected that is not likely to ever be used in actual practice.

At block 520, FIG. 5, a color scheme is selected by the user from the color scheme pane 220 for application to the template previews for generating colorized template previews. At block 525, the software application utilized by the user for displaying and editing a selected template parses each of the template previews and replaces each of the placeholder colors with the colors designated by the user-selected color scheme. For example, if the user selects the color scheme aqua, then each placeholder defined in each of the template previews is replaced with the appropriate color as designated by the color scheme aqua. At block 530, the template previews are redrawn, as illustrated in FIG. 6, with the user-selected color scheme colors replacing each of the color placeholders. At block 535, the template previews colorized according to the user-selected color scheme are displayed in the workspace 225 of the user interface 200, as illustrated in FIG. 2.

As described above with reference to FIGS. 3 and 4, each of the template previews is now displayed colorized according to the color scheme selected by the user, and the user may review each of the potential templates with the applied color scheme. If the user selects a second color scheme, the above-described process is repeated, and the template previews will be automatically displayed colorized according to the second selected color scheme. If the user decides on a particular template, the user may select the associated template preview, and the associated actual template will be displayed to the user for editing. The displayed template will be colorized according to the selected color scheme. If the user desires a different color scheme, the user may return to the displayed template previews and select a second color scheme, or the user may apply a new color scheme directly to the displayed template.

As described herein, methods and systems of the present invention provide for generation of colorized template previews or documents to allow a user to preview the application of a selected color scheme to a collection of selectable templates or documents prior to selection of the actual template or document for use/editing. It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A method of generating colorized template previews, the method comprising:
    displaying a plurality of template previews corresponding to a selected template type, wherein each of the template previews comprises defining at least one field for at least one of the following:
    receiving colorization, and
    enhancing a visual effect of the plurality of template previews;
    associating at least one field defined for receiving colorization in one of the plurality of template previews with at least one field defined for receiving colorization in each of the others of the plurality of template previews;
    selecting a color scheme for application to the at least one fields defined for receiving colorization in the plurality of template previews;
    colorizing the at least one fields defined for receiving colorization in the plurality of template previews according to the selected color scheme, wherein the associated fields defined for receiving colorization in the plurality of template previews each receive the same colorization; and
    displaying the colorized template previews.

2. The method of claim 1, prior to displaying the plurality of template previews, selecting a template type.

3. The method of claim 1, prior to selecting a color scheme for application to the at least one field defined for receiving colorization, colorizing each of the at least one fields with a default color.

4. The method of claim 1, prior to colorizing each of the at least one field defined for receiving colorization according to the selected color scheme, passing at least one templates corresponding to the at least one of the plurality of template previews and the selected color scheme to a template generator application.

5. The method of claim 4, further comprising applying the selected color scheme to the at least one templates in the generator application and creating the at least one template previews in bitmap format.

6. The method of claim 5, further comprising displaying the at least one template previews corresponding to the selected template type in a bitmap format.

7. The method of claim 1, further comprising selecting one of the displayed template previews colorized according to the selected color scheme.

8. The method of claim 7, further comprising displaying an editable template corresponding to the selected template preview, the editable template colorized according to the selected color scheme.

9. A method of generating colorized template previews, comprising:
  displaying a plurality of template previews corresponding to a selected template type;
  defining at least one field for receiving colorization in each of the plurality of template previews, wherein the at least one defined field is defined for at least one of the following:
    receiving colorization, and
    enhancing a visual effect of the plurality of template previews;
  associating at least one field defined for receiving colorization in one of the plurality of template previews with at least one field defined for receiving colorization in each of the others of the plurality of template previews;
  populating each of the at least one defined fields with a color placeholder;
  selecting a color scheme for application to the at least one defined fields;
  replacing each color placeholder with at least one color designated by the selected color scheme and thereby colorizing the plurality of template previews according to the selected color scheme, wherein the associated fields defined for receiving colorization in the plurality of template previews each receive the same colorization; and
  displaying the colorized template previews.

10. The method of claim 9, prior to displaying of the plurality of template previews, selecting a template type.

11. The method of claim 9, prior to replacing each color placeholder with the at least one colors designated by the selected color scheme, parsing each of the plurality of template previews for locating color placeholders.

12. The method of claim 9, further comprising displaying the plurality of template previews corresponding to the selected template type in a bitmap format.

13. The method of claim 9, further comprising selecting one of the displayed template previews.

14. The method of claim 13, further comprising displaying an editable template corresponding to the selected template preview, the editable template colorized according to the selected color scheme.

15. A computer-readable medium containing computer-executable instructions which when executed by a computer perform a method of generating colorized template previews, the method comprising:
  displaying a plurality of template previews corresponding to a selected template type, wherein each of the template previews comprises defining at least one field for at least one of the following:
    receiving colorization, and
    enhancing a visual effect of the plurality of template previews;
  associating at least one field defined for receiving colorization in one of the plurality of template previews with at least one field defined for receiving colorization in each of the others of the plurality of template previews;
  selecting a color scheme for application to the at least one fields defined for receiving colorization in the plurality of template previews;
  colorizing the at least one fields defined for receiving colorization in the plurality of template previews according to the selected color scheme, wherein the associated fields defined for receiving colorization in the plurality of template previews each receive the same colorization; and
  displaying the colorized template previews.

16. The computer-readable medium of claim 15, prior to colorizing each of the at least one fields defined for receiving colorization according to the selected color scheme, passing a plurality of templates represented by the plurality of template previews and the selected color scheme to a template generator application.

17. The computer-readable medium of claim 15, further comprising selecting one of the displayed template previews colorized according to the selected color scheme.

18. The computer-readable medium of claim 17, further comprising displaying an editable template corresponding to the selected template preview, the editable template colorized according to the selected color scheme.

19. A computer-readable medium containing computer-executable instructions which when executed by a computer perform a method of generating colorized template previews, the method comprising:
  displaying a plurality of template previews corresponding to a selected template type;
  defining at least one field fo recieving colorization in each of the plurality of template previews wherein the at least one defined field for is defined for at least one of the following:
    receiving colorization, and
    enhancing a visual effect of the plurality of template previews;
  associating at least one field defined for receiving colorization in one of the plurality of template previews with at least one field defined for receiving colorization in each of the others of the plurality of template previews;
  populating each of the at least one defined fields with a color placeholder;
  selecting a color scheme for application to the at least one defined field;
  replacing each color placeholder with one or more colors designated by the selected color scheme and thereby colorizing the plurality of template previews according to the selected color scheme, wherein the associated fields defined for receiving colorization in the plurality of template previews each receives the same colorization; and
  displaying the colorized template previews.

20. The computer-readable medium of claim 19, prior to replacing each color placeholder with the at least one colors designated by the selected color scheme, parsing each of the plurality of template previews for locating color placeholders.

21. The computer-readable medium of claim 19, further comprising selecting one of the displayed template previews.

22. The computer-readable medium of claim 21, further comprising displaying an editable template corresponding to the selected template preview, the editable template colorized according to the selected color scheme.

23. A method of generating colorized template previews, comprising:
  displaying a plurality of template previews corresponding to a selected template type, wherein each of the template previews comprises defining at least one field for at least one of the following:
    receiving colorization, and enhancing a visual effect of the plurality of template previews;

associating at least one field defined for receiving colorization in one of the plurality of template previews with at least one field defined for receiving colorization in each of the others of the plurality of template previews;

selecting a color scheme for application to at least one fields defined for receiving colorization in the plurality of template previews;

passing a plurality of templates represented by the plurality of template previews and the selected color scheme to a template generator application;

at the template generator application, colorizing the at least one fields defined for receiving colorization in the plurality of template previews according to the selected color scheme, wherein the associated fields defined for receiving colorization in the plurality of template previews each receive the same colorization;

creating preview bitmaps from the plurality of templates colorized by the template generator application; and displaying the preview bitmaps.

24. The method of claim 23, further comprising displaying an editable template corresponding to a preview bitmap selected from the colorized preview bitmaps, the editable template colorized according to the selected color scheme.

25. A method of generating colorized template previews, comprising:

displaying a plurality of template previews corresponding to a selected template type;

defining at least one field for receiving colorization in each of the plurality of template previews wherein the at least one defined field is defined for at least one of the following:

receiving colorization, and enhancing a visual effect of the plurality of template previews;

associating at least one field defined for receiving colorization in one of the plurality of template previews with at least one field defined for receiving colorization in each of the others of the plurality of template previews;

populating each of the at least one defined fields with a color placeholder;

selecting a color scheme for application to the at least one defined fields;

parsing each of the plurality of template previews to locate the color placeholders;

replacing each color placeholder with at least one color designated by the selected color scheme and thereby colorizing the plurality of template previews according to the selected color scheme, wherein the associated fields defined for receiving colorization in the plurality of template previews each receive the same colorization; and displaying the colorized template previews.

26. The method of claim 25, further comprising displaying an editable template corresponding to a template preview selected from the colorized template previews, the editable template colorized according to the selected color scheme.

* * * * *